(12) United States Patent
Hiraiwa

(10) Patent No.: US 8,307,969 B2
(45) Date of Patent: Nov. 13, 2012

(54) SHIFT DEVICE WITH SYNCHRONIZER

(75) Inventor: Kazuyoshi Hiraiwa, Yokohama (JP)

(73) Assignee: Kyowa Metal Works Co., Ltd., Kanagawa-ku (JP)

( * ) Notice: Subject to any disclaimer, the term of this patent is extended or adjusted under 35 U.S.C. 154(b) by 568 days.

(21) Appl. No.: 12/567,244

(22) Filed: Sep. 25, 2009

(65) Prior Publication Data

US 2010/0012453 A1 Jan. 21, 2010

(30) Foreign Application Priority Data

Mar. 27, 2008 (JP) .................................. 2008-082334

(51) Int. Cl.
*F16D 23/06* (2006.01)
(52) U.S. Cl. ................................ 192/53.31; 192/53.343
(58) Field of Classification Search .............. 192/53.31, 192/53.341, 53.343
See application file for complete search history.

(56) References Cited

U.S. PATENT DOCUMENTS

| | | | | |
|---|---|---|---|---|
| 3,618,724 A | * | 11/1971 | Oehl | 192/53.343 |
| 4,836,041 A | * | 6/1989 | Falzoni et al. | 74/339 |
| 4,969,369 A | * | 11/1990 | Okubo et al. | 74/411.5 |
| 2007/0029155 A1 | * | 2/2007 | Hiraiwa | 192/53.31 |
| 2008/0066568 A1 | * | 3/2008 | Hackl et al. | 74/339 |

FOREIGN PATENT DOCUMENTS

| | | | | |
|---|---|---|---|---|
| JP | 6-159389 A | * | 6/1994 | |
| JP | 2007-040491 A | | 2/2007 | |
| JP | 2007-225071 A | | 9/2007 | |

* cited by examiner

*Primary Examiner* — Richard M. Lorence
(74) *Attorney, Agent, or Firm* — Wenderoth, Limd & Ponack, L.L.P.

(57) ABSTRACT

A gear has a hub with cut-off portions and outer splines as one unit. Thrust pieces are inserted in the cut-off portions for transmitting thrust between a shift sleeve and a synchronizer ring. The gear has a flange portion formed with supporting holes corresponding to the cut-off portions provided with a force-amplifying slope at synchronized member sides thereof. First end portions of the thrust pieces are inserted in the supporting holes. Second end portions thereof are formed with a side end surface for receiving friction torque from the synchronizer ring and with a pressure-receiving slope for transmitting the friction torque to the force-amplifying slope. The thrust pieces swing around centers in the supporting holes so that the second end portions swing in a rotational direction to contact the pressure-receiving slopes with the force-amplifying slopes to change the friction torque to the thrust acting on the synchronizer ring.

6 Claims, 6 Drawing Sheets

SHIFT DEVICE WITH SYNCHRONIZER

BACKGROUND OF THE INVENTION

1. Field of the Invention

The present invention relates to a shift device with a synchronizer for a transmission in which pressing force applied to a shift sleeve can be amplified into larger pressing force acting on a synchronizer ring while gears of the transmission are shifted, thereby reducing operating force necessary for a driver or an actuator.

2. Description of the Related Art

A shift device with a synchronizer for a transmission of this kind is disclosed in Japanese examined patent applications publication No. 2007-040491 and No. 2007-225071. These conventional shift devices have a hub, a sleeve, synchronizer rings and a plurality of thrust pieces. In these shift devices, contact of slopes between the hub and the synchronizer ring changes friction torque generated by the synchronizer ring into thrust for pressing the synchronizer ring, thereby amplifying press force acting on the synchronizer ring to increase synchronization performance. This is called as a self-servo effect or force amplifying effect.

The thrust pieces are provided between the hub and the synchronizer ring so that they can swing in cut-off portions of the hub to obtain the force amplifying effect by contacting the slopes of the thrust pieces and the hub. The thrust pieces prevents the slopes from being contacted with each other when the sleeve is positioned at a neutral position in order to remove the thrust due to drag friction torque of the synchronizer ring at the neutral position.

These conventional shift devices with the synchronizer, however, encounter the following problems.

In order to ensure the thrust pieces to swing in the cut-off portions in theses conventional shift devices, the cut-off portions of the hub need a sufficient axial length to some extent. This makes it difficult to apply the thrust pieces to a shift device for a reverse gear, because a hub of the reverse-gear shift device is formed together with a gear as one unit and is formed with splines, an axial length of which becomes short.

It is, therefore, an object of the present invention to provide a shift device with a synchronizer for a transmission which overcomes the foregoing drawbacks and can apply swingable thrust pieces to a shift device, having a hub with splines in short axial length, such as a reverse-gear shift device.

SUMMARY OF THE INVENTION

According to a first aspect of the present invention there is provided a shift device with a synchronizer which includes a shaft, a gear, a synchronized member, a shift sleeve, a synchronizer ring and a plurality of thrust pieces. The gear is capable of rotating on the shaft and has a hub as one unit. The hub is formed with a plurality of cut-off portions and outer splines. The synchronized member is capable of rotating on the shaft, and the synchronized member has outer splines and a friction outer surface. The shift sleeve is formed with inner splines engaging with the outer splines of the gear so that the shift sleeve can move along the outer splines of the gear, the inner splines being capable of engaging with the outer splines of the synchronized member and disengaging from the outer splines of the synchronized member according to a position of the shift sleeve. The synchronizer ring is arranged between the gear and the synchronized member, and has a friction inner surface corresponding to the friction outer surface of the synchronized member The thrust pieces are inserted in the cut-off portions, and are capable of transmitting thrust between the shift sleeve and the synchronizer ring. The gear has a flange portion formed with a plurality of supporting holes corresponding to the cut-off portions. The cut-off portions are provided with a force-amplifying slope at synchronized member sides of the cut-off portions. The thrust pieces have first end portions and second end portions. The first end portions are inserted in the supporting holes. The second end portions are formed with a side end surface for receiving friction torque from the synchronizer ring and with a pressure-receiving slope for transmitting the friction torque to the force-amplifying slope. The thrust pieces swing around centers in the supporting holes so that the second end portions swing in a rotational direction to contact the pressure-receiving slopes with the force-amplifying slopes to change the friction torque to the thrust acting on the synchronizer ring.

Preferably, the shift device further has a spring, and the thrust pieces are formed on inner circumferential surfaces of the thrust pieces with a groove for receiving the spring so that the thrust pieces are urged outwardly in a radial direction. The spring applies force corresponding to tensile force of the spring to press the synchronizer ring in an axial direction during the thrust pieces move together with the shift sleeve toward the synchronized member.

Preferably, the spring is formed like a letter C.

Preferably, the number of the thrust pieces is three.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Figure 1:
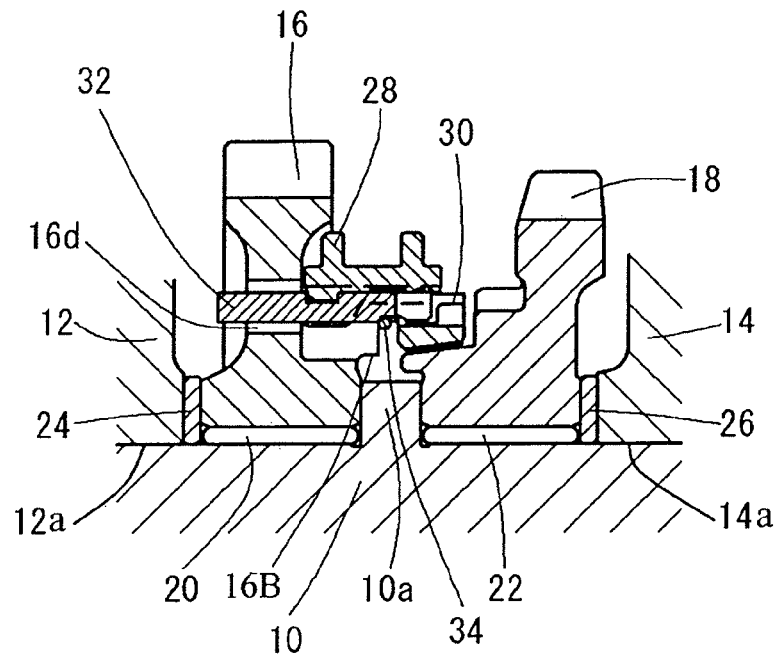
FIG. 1 is a cross-sectional plan view showing a shift device with a synchronizer of an embodiment according to the present invention.

Throughout the following detailed description, similar reference characters and numbers refer to similar elements in all figures of the drawings, and their descriptions are omitted for eliminating duplication.

Figure 2:
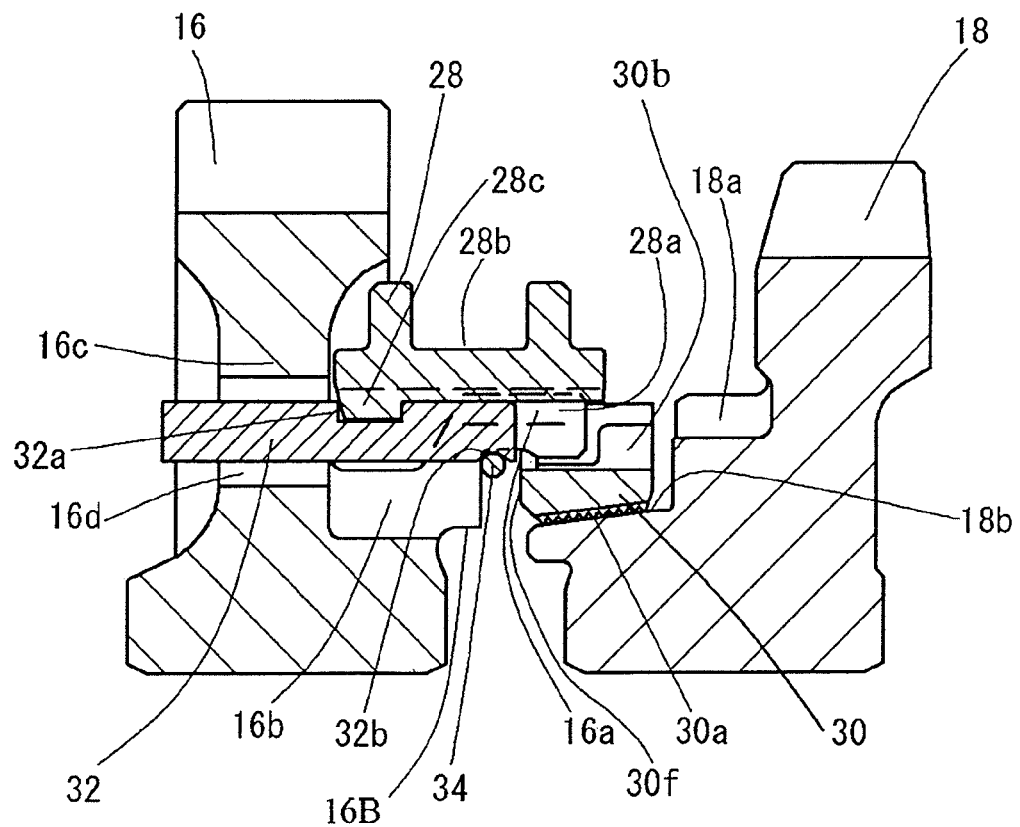
FIG. 2 is an enlarged cross-sectional plan view showing a input gear, a drive gear, a shift sleeve, a thrust piece, a synchronizer ring and a spring, which are used as main parts in the shift device shown in FIG. 1.

Referring to FIG. 1 and FIG. 2, there is shown a shift device of a preferred embodiment according to the present invention, which has a synchronizer and is adapted for a transmission of a motor vehicle. In the embodiment, the shift device is applied to a reverse gear set of the transmission.

The shift device of includes a shaft 10, an input gear 16, a drive gear 18, a shift sleeve 28, a synchronizer ring 30 and three thrust pieces 32.

The transmission has a case 12 and a housing 14. The case 12 and the hosing 14 are formed with a hole 12a and a hole 14a to receive and support both end portions of the shaft 10, respectively.

The input gear 16 and the drive gear 18 are provided rotatably on the shaft 10 through bearings 20 and 22, respectively. Axial movements of the input gear 16 and the drive gear 18 are restricted relative to the case 12 and housing 14 by a flange portion 10a of the shaft 10 and two washers 24 and 26. The flange portion 10a is formed on the shaft 10 at a position between the input gear 16 and the drive gear 18. The washer 24 is placed between the input gear 16 and the case 12, and the washer 26 is placed between the drive gear 18 and the housing 14. Incidentally, the input gear acts as a gear of the present invention, and the drive gear 18 acts as a synchronized member of the present invention.

The input gear 16 is engaged with a not-shown gear that is connected with a not-shown engine through a not-shown clutch. The drive gear 18 is engaged with a not-shown gear that is connected with wheels of the motor vehicle. The input gear 16 and the drive gear 18 constitute the reverse gear set.

Figure 3:
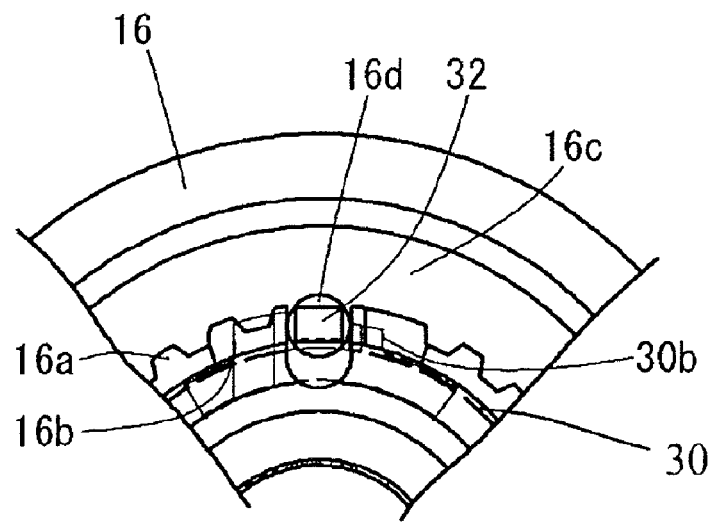
FIG. 3 is a fragmentary view showing the input gear equipped with the thrust piece and the synchronizer ring, which are seen from a right side in FIG. 1.

As shown in FIG. 2 and FIG. 3, the input gear 16 is formed at its right side in FIG. 2 with a plurality of outer splines 16a. The splines 16a are engaged with a plurality of inner splines 28a formed on an inner circumferential surface of the shift sleeve 28 so that the shift sleeve 28 can move along the splines 16a relative to the input gear 16 in an axial direction thereof. In this embodiment, a part of splines 16a corresponds to a hub of a conventional synchronizer. In other words, the hub 16B and the input gear 16 are formed as one unit in this embodiment. Accordingly, the hub 16B with the splines 16a is short in an axial length.

On the other hand, the drive gear 18 is formed at its left side in FIG. 2 with a plurality of outer splines 18a, which can be engaged with and disengaged from the splines 28a of the shift sleeve 28 according to a position of the shift sleeve 28. The drive gear 18 is further formed with a friction surface 18b formed like a cone at its left side thereof in FIG. 2.

The shift sleeve 28 is formed on its outer circumferential surface with a circumferential groove 28b, which is engaged with a not-shown shift fork that is driven by a hand of a driver or an actuator. The shift fork moves the shift sleeve 28 in the axial direction in a gear-shift operation of the transmission. Specifically, FIGS. 1 and 2 show a neutral position where the splines 28a of the shift sleeve 28 is disengaged with the splines of the drive gear 18, being engaged with the splines 16a of the input gear 16. When the shift fork moves the shift sleeve 28a in a right direction in FIGS. 1 and 2 from the neutral position to engage the splines 28a of the shift sleeve 28 with the splines 18a of the drive gear 18, being engaged with the splines 16a of the input gear 16, the input gear 16 and the drive gear 18 are connected with each other through the shift sleeve 28, so that the engine can drive the wheels through the shift device.

The synchronizer ring 30 is arranged between the input gear 16 and the drive gear 18 and at an outward side from the cone surface 18b of the drive gear 18 in a radial direction. The synchronizer ring 30 is formed on its inner circumferential surface with a friction surface 30a formed like a cone. The friction surface 30a is formed to fit to the friction surface 18a of the drive gear 18 so as to generate friction torque for synchronization of the input gear 16 and the drive gear 18. Three projected portions 30b are formed on an outer circumferential portion of the synchronizer ring 30.

The splines 16a of the input gear 16 are partially cut off at their outer circumferential portion to provide three cut-off portions 16b, into which the projected portions 30b of the synchronizer ring 30 are inserted, respectively. The cut-off portions 16b are formed to have clearances in a rotational direction thereof, relative to the projected portions 30b.

Figure 8:
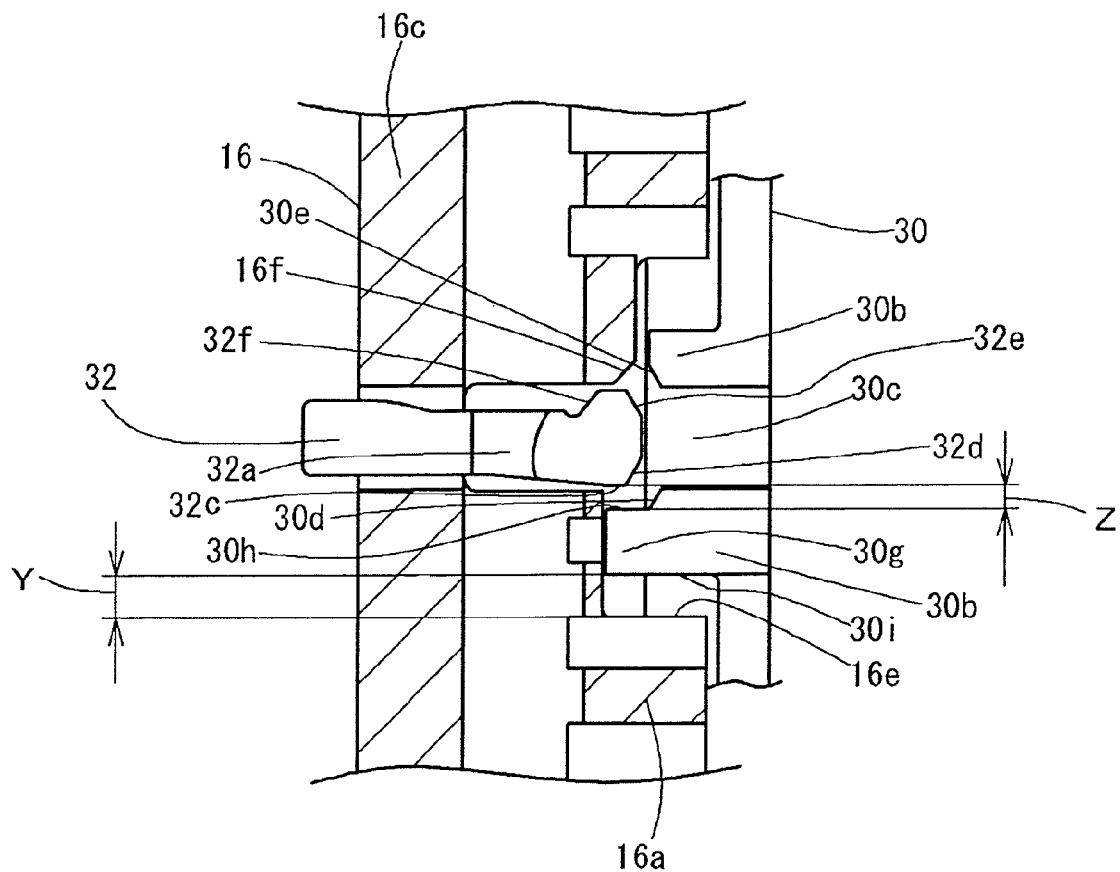
FIG. 8 is an enlarged fragmentary development-elevated view showing main parts of the shift device shown in FIG. 7.

The input gear 16 has a flange portion 16c, formed like a thin disc, between a teeth portion at its outer circumferential position and a hub portion at its inner circumferential position. The flange portion 16c is formed with three supporting holes 16d at positions respectively corresponding to the cut-off portions 16b. Incidentally, the cut-off portions 16 are provided with a holding surface 16e as shown in FIG. 8.

The thrust pieces 32 have one end portion (first end portion), which is inserted and maintained into the respective supporting hole 16d, so that they can move in the axial direction and swing at centers in the supporting holes 16d. The thrust pieces 32 are engaged with an inner circumferential portion of the shift sleeve 28. Specifically, the thrust pieces 32 are formed on their outer surfaces with a groove 32a, which is engaged with a projecting portion 28c formed on the inner circumferential surface of the shift sleeve 28. The three projecting portions 28c are formed of residual portions of three splines of the splines 28a, where right side portions, shown in FIG. 2, of the three splines are cut off to obtain left side portions thereof projecting inward.

Figure 4:
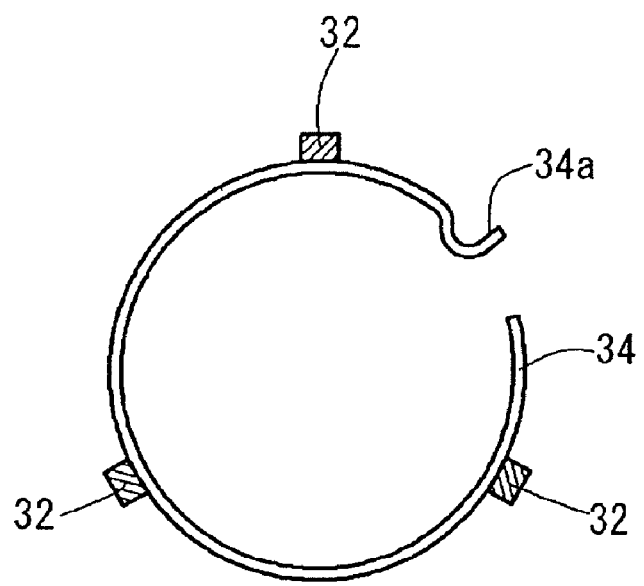
FIG. 4 is a partially cross-sectional view showing the spring that is engaged with the thrust pieces to urge the thrust pieces outwardly in a radial direction.
Figure 5:
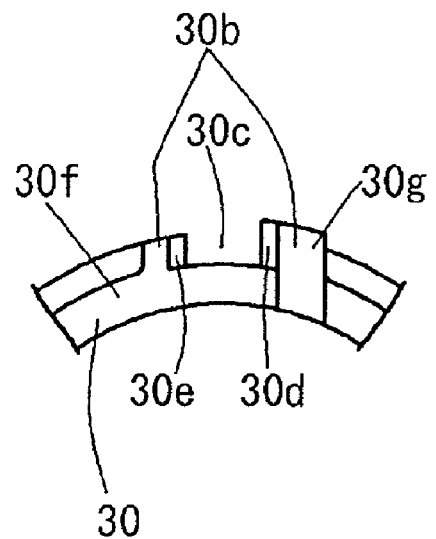
FIG. 5 is a fragmentary view showing the synchronizer ring, which is seen from the right side in FIG. 1.
Figure 6:
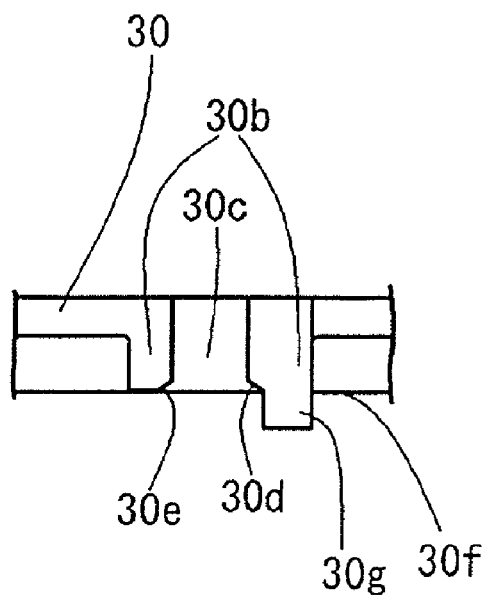
FIG. 6 is a fragmentary view showing the synchronizer ring, which is seen from the above in FIG. 5.
Figure 7:
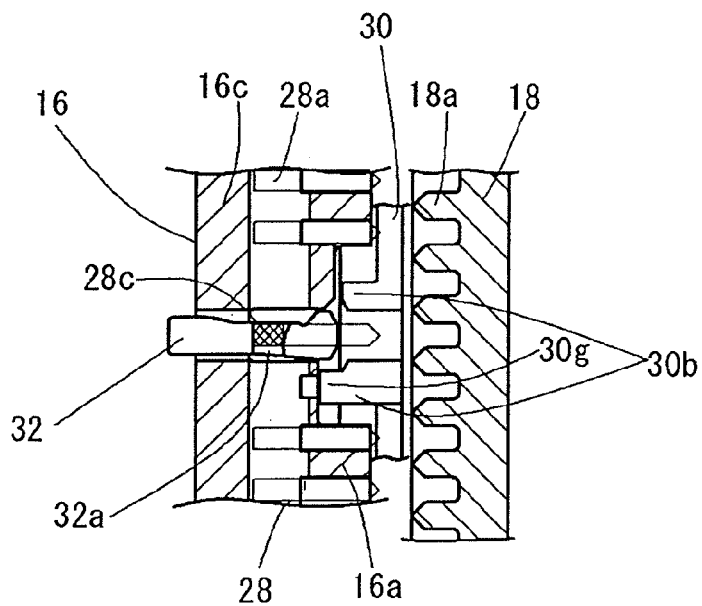
FIG. 7 is a fragmentary development-elevated view showing a position relationship of splines of the input gear, the shift sleeve and the drive gear and the thrust piece of the shift device.

As shown in FIG. 2 and FIG. 4, the thrust pieces 32 are formed on the inner circumferential surfaces with spring grooves 32b to receive a spring 34. The spring 34 is made of elastic wire formed like a letter C, having one end portion which is bent outwardly in a radial direction to be engaged in a not-shown hole formed in the input gear 16 so that a rotational movement of the spring 34 is restricted. The spring 34 applies elastic force to the thrust pieces 32 so that they are pressed outwardly in the radial direction toward the inner circumferential surface of the shift sleeve 28.

As shown in FIGS. 5, 6, 7 and 8, the projected portions 30b of the synchronizer ring 30 are formed at their central positions with an axial directional groove 30c, which has a circumferential directional width through which the thrust piece 32 can pass. The synchronizer ring 30 is formed with a first slope 30d and a second slope 30e at input-gear side both-end portions of the axial directional groove 30c, respectively. Incidentally, in FIG. 7, the projecting portions 28c of the shift sleeves are omitted and the splines 28a thereof are illustrated by using thin lines.

Each thrust piece 32 has a first slope 32d and a second slope 32e at opposite sides of the other end portion (second end portion) thereof, namely a drive-gear side end portion, where the first slope 32d and the second slope 32e of the thrust piece 32 correspond to the first slope 30d and the second slope 30e of the projected portion 30b of the synchronizer ring 30, respectively.

The synchronizer ring 30 is provided with holding portions 30g projected from back surfaces 30f of the projected portions 30b toward the input gear 16. Each holding portion 30g is formed with a first holding surface 30h and a second holding surface 30i at opposite sides thereof in the rotational direction, respectively.

As shown in FIG. 8, the first holding surface 30h is set to contact with a side end surface 32c of the drive-gear side end portion of the thrust piece 32 when the synchronizer ring 30 rotates in one rotational direction by a rotational directional length Z relative to the input gear 16 from a state shown in FIG. 8. The second holding surface 30i is set to contact with the holding surface 16e of the cut-off portion 16b of the input gear 16 when the synchronizer ring 30 rotates in an opposite rotational direction by a length Y relative to the input gear 16 from the state shown in FIG. 8.

Each thrust piece 32 is formed with a pressure-receiving slope 32f at the drive-gear side of the other end portion, and the input gear 16 is formed with a force-amplifying slope 16f corresponding to the pressure-receiving slope 32f.

Figure 9:
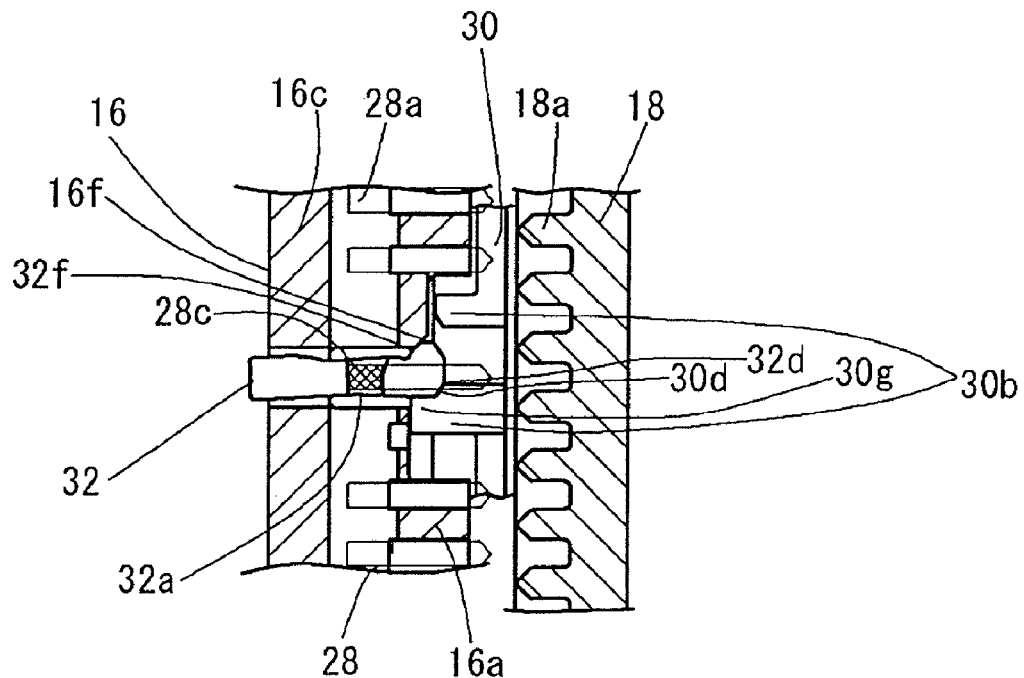
FIG. 9 is a fragmentary development-elevated view showing the position relationship of the splines of the input gear, the shift sleeve and the drive gear and the thrust piece when friction torque starts to generate between friction surfaces of the synchronizer ring and the drive gear to rotate the synchronizer ring relative to the input gear.
Figure 10:
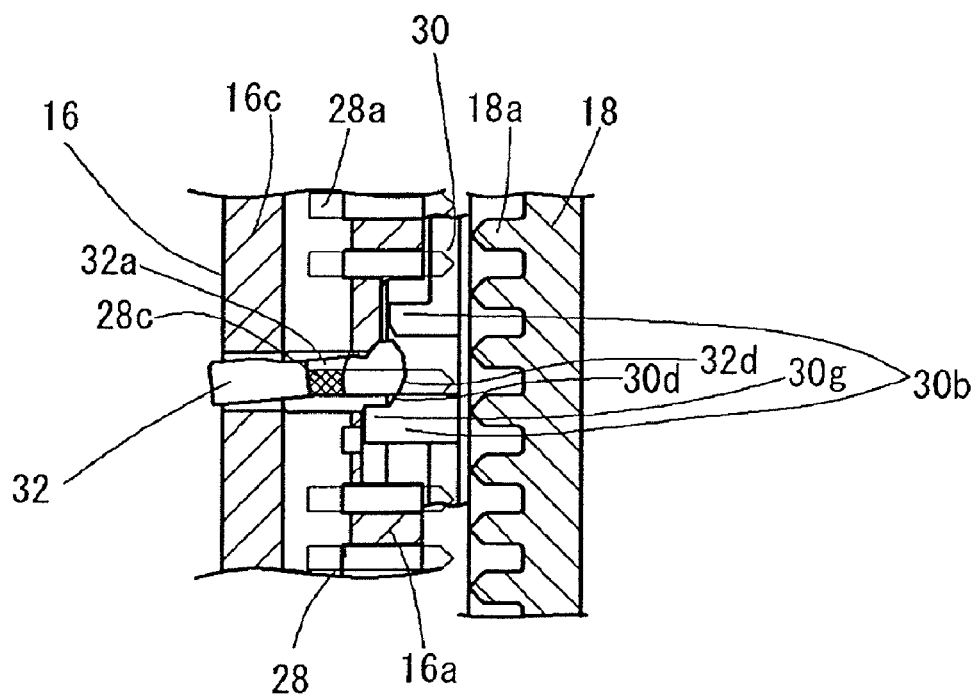
FIG. 10 is a development-elevated view showing the position relationship of the splines of the input gear, the shift sleeve and the drive gear and the thrust piece when synchronization of the input gear and the drive gear substantially ends so that the thrust pieces relatively rotate the synchronizer ring to move toward the drive gear.
Figure 11:
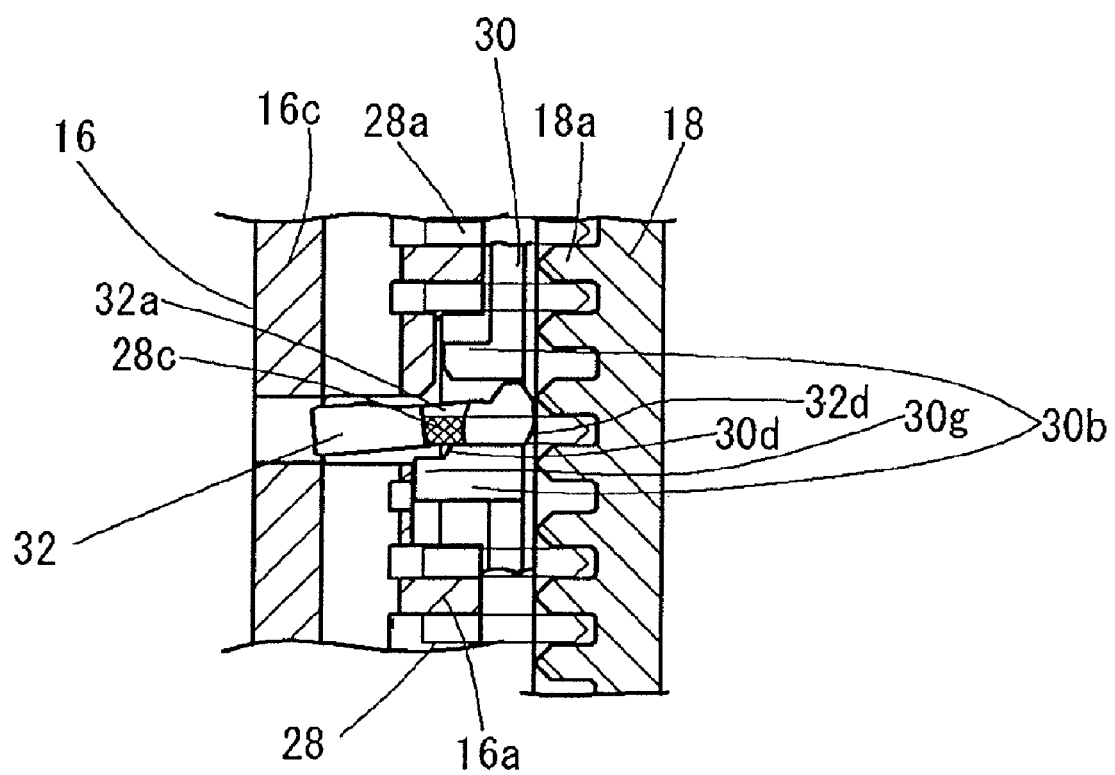
FIG. 11 is a development-elevated view showing the position relationship of the splines of the input gear, the shift sleeve and the drive gear and the thrust piece when a reverse-shifting operation ends by the engagement of the splines of the shift sleeve and the drive gear.

The operation of the shift device of the embodiment will be described with reference to the drawings of FIGS. 8 to 11. FIGS. 9 to 11 are development elevations similarly to FIGS. 7 and 8.

At the neutral position, the splines 28a of the shift sleeve 28 is engaged with the splines 16a of the input gear 16, but it is not engaged with the splines 18a of the drive gear 18. The thrust pieces 32 do not contact with the synchronizer ring 30.

When the shift device is shifted to a reverse position in a state where the clutch is released and a rotational speed difference exists between the input gear 16 and the drive gear 18, the shift fork moves the shift sleeve 28 toward the input gear 18. In this movement of the shift sleeve 28, it drives the thrust pieces 32 together therewith because of the engagement of the projecting portions 28c of the shift sleeve 28 and the grooves 32a of the thrust pieces 32. This movement of the thrust pieces 32 causes the spring 34, which is engaged in the spring grooves 32a of the thrust pieces, to contact with the back surface 30f of the synchronizer ring 30. Then the spring 34 elastically contracts inwardly to be disengaged from the spring groove 32b, applying press force, which corresponds to its tensile force, to the synchronizer ring 30 in the axial direction.

The press force causes the friction surface 30a of the synchronizer ring 30 to be pressed on the friction surface 18b of the drive gear 18, so that friction torque generates therebetween to rotate the synchronizer ring 30 relative to the input gear 16, becoming a state shown in FIG. 9.

Specifically, the friction torque closes the clearance Z so that the first holding surface 30h of the synchronizer ring 30 contacts with the side end surfaces 32c of the thrust pieces 32. Further, the first slopes 32d of the thrust pieces 32 contact with the first slopes 30d of the synchronizer ring 30, the thrust pieces 32 being swung at the centers in the supporting holes 16d, as shown in FIG. 9, to contact the pressure-receiving slopes 32f of the thrust pieces 32 with the force-amplifying slopes 16f of the input gear 16.

As the shift sleeve 28 is pressed further toward the drive gear 18, the first slopes 32d of the thrust pieces 32 are kept pressed on the first slopes 30d of the synchronizer ring 30. In this operation, the thrust pieces 32 keep pressed on the synchronizer ring 30 to obtain a synchronization effect between the input gear 16 and the drive gear 18, as long as the friction torque is generated between the friction surfaces 30a and 18b, when the inclined angles of the first slopes 32d and 30d are set appropriately.

In this synchronization operation, the friction torque, which generates between the friction surfaces 30a and 18b, is transmitted through the pressure-receiving slope 32f to the force-amplifying slope 16f of the input gear 16, thereby producing thrust.

In other words, the pressure-receiving slope 32f and the force-amplifying slope 16f change rotational directional force due to the friction torque to axial directional force. Consequently, this axial directional force, namely the thrust, is added to act on the synchronizer ring 30 through the thrust pieces 32, so as to produce a force-amplifying effect.

This means that the synchronizer ring 30 is pressed not only by press force generated through the shift sleeve and the shift fork that are pressed by a hand of a driver or a not-shown actuator, but also by the thrust generated through the pressure-receiving slope 32f and the force-amplifying slope 16f. This improves synchronization performance of the shift device of the embodiment by the thrust that produces the force-amplifying effect, relative to those of conventional shift devices such as normal Borg-Warner type ones.

As the press force generated by the shift sleeve 28 is being pressed and the thrust generated through the pressure-receiving slope 32f and the force-amplifying slope 16f is being applied, the rotational speed difference between the input gear 16 and the drive gear 18 gradually decreases. Accordingly, the friction torque becomes smaller, which means that the input gear 16 and the drive gear 18 become substantially synchronized.

As the shift sleeve 28 is pressed further toward the drive gear 18, the thrust pieces 32 relatively rotate the synchronizer ring 30 by the length Z shown in FIG. 8. As a result, a position relationship of the shift sleeve 28, the thrust pieces 32 and the synchronizer ring 30 becomes a state shown in FIG. 10.

As the shift sleeve 28 is further moved toward the drive gear 18, the splines 28a of the shift sleeve 28 and the splines 18a of the drive gear 18 become to be engaged with each other as shown FIG. 11. This is the end of a reverse-shifting operation.

As understood from the above description, the shift device of the embodiment has the following advantages.

The shift device of the embodiment can obtain the self-servo effect, namely the force-amplifying effect of the synchronization thereof by using the thrust pieces 32 without preventing thrust due to drag friction torque at the neutral position.

The shift device of the embodiment, which uses the in-supporting-hole 16d swingable thrust pieces 32, can be applied to a shift device having a hub 16B with splines 16a short in the axial length, such as a reverse-gear shift device, because the thrust pieces 32 can sufficiently swing in the supporting holes 16d formed in the flange portions 16c of the input gear 16.

While there have been particularly shown and described with reference to preferred embodiments thereof, it will be understood that various modifications may be made therein, and it is intended to cover in the appended claims and all such modifications as fall within the true spirit and scope of the invention.

In the embodiment, the pressure-receiving slopes 32f are formed on the one sides, in the rotational direction, of the thrust pieces, which is sufficient for reverse-gear shift devices. The pressure-receiving slopes 32f may be formed on both sides of the thrust pieces to obtain the self-servo effect in both rotational directions.

The synchronizer ring 24 may have an oil groove on its inner friction surface in order to increase a friction coefficient of the friction surface, and may be made of material for improving synchronizing ability.

The shift device with the synchronizer may be applied to a multi-corn type synchronizer, which has several friction surfaces.

The shift device may be manually operated, or mechanically operated by an actuator.

What is claimed is:

1. A shift device with a synchronizer, comprising:
   a shaft;
   a gear that is capable of rotating on the shaft and has a hub as one unit, the hub being formed with a plurality of cut-off portions and outer splines;
   a synchronized member that is capable of rotating on the shaft, the synchronized member having outer splines and a friction outer surface;
   a shift sleeve that is formed with inner splines engaging with the outer splines of the gear so that the shift sleeve can move along the outer splines of the gear, the inner splines being capable of engaging with the outer splines of the synchronized member and disengaging from the outer splines of the synchronized member according to a position of the shift sleeve;
   a synchronizer ring that is arranged between the gear and the synchronized member, the synchronizer ring having a friction inner surface corresponding to the friction outer surface of the synchronized member; and
   a plurality of thrust pieces that are inserted in the cut-off portions, the thrust pieces being capable of transmitting thrust between the shift sleeve and the synchronizer ring, wherein
   the gear has a flange portion formed with a plurality of supporting holes corresponding to the cut-off portions, the cut-off portions being provided with a force-amplifying slope at synchronized member sides of the cut-off portions, wherein
   the thrust pieces have first end portions and second end portions, the first end portions being inserted in the supporting holes, and the second end portions being formed with a side end surface for receiving friction torque from the synchronizer ring and with a pressure-receiving slope for transmitting the friction torque to the force-amplifying slope, and wherein
   the thrust pieces swing around centers in the supporting holes so that the second end portions swing in a rotational direction to contact the pressure-receiving slopes with the force-amplifying slopes to change the friction torque to the thrust acting on the synchronizer ring.

2. The shift device according to claim 1, further comprising:
   a spring, wherein
   the thrust pieces are formed on inner circumferential surfaces of the thrust pieces with a groove for receiving the spring so that the thrust pieces are urged outwardly in a radial direction, wherein
   the spring applies force corresponding to tensile force of the spring to press the synchronizer ring in an axial direction during the thrust pieces move together with the shift sleeve toward the synchronized member.

3. The shift device according to claim 2, wherein the spring is formed in a letter C shape.

4. The shift device according to claim 3, wherein the number of the thrust pieces is three.

5. The shift device according to claim 2, wherein the number of the thrust pieces is three.

6. The shift device according to claim 1, wherein the number of the thrust pieces is three.

* * * * *